United States Patent

[11] 3,585,369

[72] Inventors Roy Edward Nather
Austin, Tex.;
Rodman A. Sharp, La Jolla; Jon A. Jenkins, San Diego, all of, Calif.

[21] Appl. No. 705,035
[22] Filed Feb. 13, 1968
[45] Patented June 15, 1971
[73] Assignee Beckman Instruments, Inc.

[54] DATA TAPE EDITOR
8 Claims, 16 Drawing Figs.

[52] U.S. Cl. .......... 235/61.11, 197/20
[51] Int. Cl. .......... G06k 7/04, B41j 5/36
[50] Field of Search .......... 197/20, 19; 235/61.6, 61.11

[56] References Cited

UNITED STATES PATENTS

| | | | |
|---|---|---|---|
| 2,905,299 | 9/1959 | Hildebrandt | 197/20 |
| 3,035,764 | 5/1962 | Beman | 235/61.9 |
| 3,076,594 | 2/1963 | Weinberg | 234/59 X |
| 3,124,674 | 3/1964 | Edwards | 235/61.11 |
| 3,237,164 | 2/1966 | Evans | 340/147 |
| 3,291,277 | 12/1966 | Borrelli | 197/20 |
| 3,340,985 | 9/1967 | Sinila | 197/19 |
| 3,355,576 | 11/1967 | Childers | 235/61.7 |
| 3,486,005 | 12/1969 | Logerwell | 235/61.6 |

*Primary Examiner*—Daryl W. Cook
*Assistant Examiner*—Robert M. Kilgore
*Attorneys*—P. R. Harder and Robert J. Steinmeyer

ABSTRACT: An instrument with two or more punched tape readers and a solenoid hand designed to control and enter data into a programmable desk calculator or similar instrument. Data on a calibration tape on one reader is employed to edit raw data on a data tape on another reader by selecting or rejecting specified data fields. The calibration tape may also store constants which are to be used repetitively in carrying out the program of the associated computer. Additional data readers may be employed to permit data from several sources to be combined in a single computer computation.

RODMAN A. SHARP
ROY E. NATHER
JON A. JENKINS
*INVENTORS*

BY T. E. Kristofferson

ATTORNEY

RODMAN A. SHARP
ROY E. NATHER
JON A. JENKINS
INVENTORS

BY T E Kristofferson
ATTORNEY

RODMAN A. SHARP
ROY E. NATHER
JON A. JENKINS
INVENTORS

BY T E Kiss...
ATTORNEY

RODMAN A. SHARP
ROY E. NATHER
JON A. JENKINS
INVENTORS

BY T E Kristofferson
ATTORNEY

RODMAN A SHARP
ROY E NATHER
JON A JENKINS
*INVENTORS*

BY [signature]
ATTORNEY

RODMAN A. SHARP
ROY E. NATHER
JON A. JENKINS
*INVENTORS*

BY T E Kiss [signature]
ATTORNEY

DATA TAPE EDITOR

BACKGROUND OF THE INVENTION

This invention relates to a data tape editor and more particularly to such an editor employing a plurality of tape readers in which a calibration or control tape on one reader serves to edit a raw data tape on another and can also provide for additional memory.

In the prior art separate endless loop tapes have been used to carry out repetitive subroutines in a computer program such as disclosed in "Arithmetic Operations in Digital Computers" by R. K. Richards, D. Van Nostrand Co., Inc. 1955, page 319. In addition devices such as automatic typewriters have employed more than one tape reader, one of which employs an endless loop tape which serves as a program and storage for information to be used repetitively.

Basically there are two ways to automatically compute net data from raw data, online and off-line. In an online computing system the computer is tied directly to an analytical instrument. The computer is fast so normally it will be idle most of the time waiting for the next analysis to finish. In a busy laboratory with several busy instruments you will need several such online computing systems. In contrast an off-line system such as the data tape editor of the instant invention, can back up several analytical instruments, several different types or several of a given kind. Raw data is accumulated at each analytical instrument, for instance, by a punched tape output. Each raw data tape is fed in turn to the data tape editor to edit and calculate final results for that instrument using stored calibration curves which may be changed in seconds by inserting a new calibration tape as the raw data input is rotated among various analytical instruments in the laboratory. The instant invention answers the need for a low cost, small, easy to use, general purpose data reduction system which may be used for example to automatically edit and enter data into an associated computer in liquid scintillation counting and other laboratory applications. It accepts raw analytical data, on punched tape for instance, and prints out net meaningful analytical results. The system automatically edits the raw data input, determines the correct calibration factors by interpolating in stored calibration tables and computes final results by means of a stored program in an associated computer. Unit conversion factors, blank values and calibration tables of any desired length may be stored externally on the calibration tape loop effectively supplementing the memory capacity of an associated computer.

In a liquid scintillation application, for example, the editor and associated computer will automatically compute, and print out, disintegrations per minute (DPM), counts per minute (CPM) or DPM as ratios to a reference standard, CPM or DPM normalized to percent of the total run, DPM or CPM corrected for decay, and so forth. The system can do this for singly and doubly labeled samples and automatically correct for samples of varying quench using external standard values to look up the proper correction factors and stored calibration tables. The system can also calculate isotope ratios, fit successive counts to a kinetic rate equation, average replicate counts and compute statistical parameters. It is also possible to use a digital data coupler coupled to an analog recorder output to produce raw data punched tape which may be used by the editor in order to apply the system to other laboratory data reduction applications such as visible UV spectrophotometry, atomic absorption analysis, flame photometry, liquid chromatography, gas chromatography and electrochemical measurements. The system can compute net concentration unit output for spectrophotometers using nonideal Beer's law curves while correcting for blanks, and automatically inserting the proper unit conversion factors. It can average a repetitive series of atomic absorption measurements, enter nonlinear calibration curves, correct for blanks and perform unit conversions. It can solve equations for multicomponent analysis visible, UV and IR spectrophotometry, can provide easy interpretation of gas and liquid chromatograms by printing out peak heights and running sums of the area under the peaks.

SUMMARY OF THE INVENTION

Accordingly, it is one object of this invention to provide a data tape editor employing a plurality of tape readers for editing raw data to be entered into a computer including means for determining whether the information on the raw data tape is acceptable.

Another object of the invention is to provide such a data tape editor capable of sensing whether or not an associated data processor is busy or can accept the data and waiting until it is free.

Still another object of the invention is to provide for such a data tape editor having a solenoid deck or keyboard entry unit which can selectively be used to put the data either into a computer, card punch or other similar device either automatically or manually.

These and other objects are achieved by providing a data tape editor for editing raw data to be entered into a utilization device having a keyboard comprising: a plurality of tape readers; a keyboard entry unit; and, a control unit having said readers connected as its inputs and said keyboard entry unit as its output, containing logic and gating circuitry for, synchronizing a calibration tape containing codes indicative of a sequence in which raw data is to be edited which one of said readers is adapted to receive and a first raw data tape containing data to be edited which another of said readers is adapted to receive, reading said calibration data tape to determine whether or not the next allowed code on the raw data tape is to be entered into the keyboard entry unit, determining whether a code on the raw data tape is an allowed code, entering the code from the raw data tape into the keyboard entry unit if it is an allowed code and directed to do so by the calibration tape and advancing both tapes, bypassing the code from the raw data tape if it is not an allowed code and advancing the raw data tape, bypassing the code from the raw data tape if it is an allowed code and directed to do so by the calibration tape and advancing both tapes, repeating the steps of reading, determining and entering or bypassing until determining when the information entered through the keyboard entry unit is complete, and actuating the utilization device through said keyboard entry unit to initiate action.

The editor may also provide for storage of constants on the calibration tape which may supplement the memory capacity the utilization device, sensing means for delaying the editor when the computer is busy, means for shutting itself off when out of tape, and may employ more than one raw data tape for combining outputs from more than one source in an application. It may edit data for various applications such as computers or card punches having keyboard entries.

The novel features which are believed to be characteristic of the invention are set forth with particularity in the appended claims. The invention and further objects and advantages thereof can best be understood by reference to the following description and accompanying drawings.

BRIEF DESCRIPTION OF THE DRAWINGS

FIG. 4A, the MF and SNC multivibrators and associated gating;

FIG. 4B, the $\overline{\text{calib}}$ration and data tape readers;

FIG. 4C, the $\overline{\text{TPL}}$ signal generator;

FIG. 4D, the GOLI signal generator;

FIG. 4E, the CL, PWSO, STR and $\overline{STR}$ signal generator,

FIG. 4F, the PSOL signal generator;

FIG. 4G, the tape reader decoding and keyboard entry unit actuating circuitry;

FIG. 4H, the WAS multivibrator and $\overline{CDF}$, $\overline{CDL}$, $\overline{CD@}$, $\overline{CDA}$, $\overline{CDB}$, $\overline{CDC}$, and $\overline{CDD}$ signal generator;

FIG. 4I, the BDO multivibrator and associated gating;

FIG. 4J, the $\overline{CRC}$ signal generator;

FIG. 4K, the ENT multivibrator and associated gating;

FIG. 4L, the $\overline{OKC}$ signal generator and associated gating; and,

FIG. 4M, the $\overline{STRN}$ signal generator and associated gating.

DESCRIPTION OF THE PREFERRED EMBODIMENT

Figure 1:
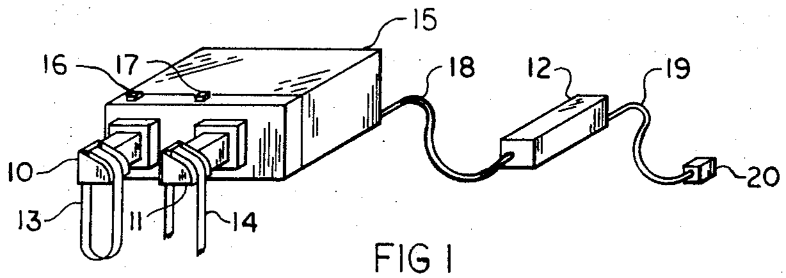
FIG. 1 is an isometric block diagram illustrating the major components of the data tape editor of the invention.

Turning now to the drawings, in FIG. 1 the major components of a preferred embodiment of the data tape reader are illustrated, keeping in mind more than two readers may be employed. Basically the editor is an instrument with two punched tape readers 10 and 11 and a solenoid deck, or keyboard entry unit 12 to enter data into a programmable desk calculator or computer, card punch, or other unit. The invention is not limited to addressing a computer. Its prime function is to edit raw data, which may be in tape form for instance, and convert it to a form which can be entered into an instrument that normally utilizes a keyboard entry. It has the ability to select and reject specified data fields and can store data in the form of constants. A calibration tape 13 in the form of an endless loop is shown contained in the tape reader 10 and a raw data tape 14 contained in the tape reader 11. The tape readers 10 and 11 may be "Teletype 33" tape readers, for example, and are shown connected to the master control unit 15 on which two illuminating switches, a power switch 15 and a start tape switch 17, are mounted. The keyboard entry unit 12 is connected to the control unit 15 by means of the cable 18 and has in turn connected to it by means of the cable 19 a sense unit 20 containing a photocell capable of detecting whether a computer busy light is on or off. The keyboard entry unit 12 may be a group of solenoids comprising a solenoid deck that can be actuated by signals decoded from the readers 10 and 11 or manually, such as Victor Comptometer Corporation, 2580 W. Olympic Blvd., Los Angeles, California, Model 50676—502, 48 V.D.C., 75 ohm solenoids, that may be mounted over a keyboard of an associated computer or over that of an IBM card punch, if it were desired to edit the raw data and place it on punched cards for example. Tape readers in addition to 10 and 11 may be used if the control unit 15 is to be employed to allow data from more than one source, for instance two separate analytical instruments, to be combined in a single computer computation. Such a system, with the suggested tape readers, may be used with analytical instruments fitted with "Teletype ASR 33" typewriter tape punch outputs. Raw data may also be entered by hand on the keyboard entry unit 12. It is obvious that magnetic tape with appropriate sensors or any other type of data readout that can be sensed may be employed in the editor of the invention.

The calibration or control tape 13 is, in the preferred embodiment, an endless loop of punched tape containing the raw data formatting instructions and calibration data. Calibration tape 13 is read automatically, once for each sample. By changing calibration tapes calibration curves can be quickly changed when going from one class of samples to another with a given instrument. Changing the calibration tape 13 permits quick adaption to input data from a variety of analytical instruments each of which will normal have different calibration curves and a different data output format. By substituting a new calibration tape 13 raw data may be read in different ways, for example changing from one liquid scintillation counting channel to another or by reading two channels of counting data instead of one when shifting from a single isotope to dual samples. A calibration tape may also allow the mixing of single and dual isotope samples. The calibration tape 13 may be produced by typing directly on the keyboard of any "Teletype ASR 33" type writer tape punch unit.

The preferred embodiment of the data tape editor as described is designed to accept and sort the ASCII (American Standard Code For Information Interchange) 8-level, start-stop, binary permutation signalling code with or without parity. Its table storage is limited only by the length of the calibration tape loop.

The calibration or control tape 13 is punched with a series of commands that specify the field on the raw data tape 14 that will be placed into an associated computer's keyboard and subsequently into the computer. The tape 13 also has all the constants for the tables that will be used in the computations for each each field of data entered. The raw data tape 14 is an unaltered analytical instruments punched output tape. The series of commands used on a calibration tape for editing the raw data tape entries are the ASCII punched codes for A, B, C, D, L, and 0. Their commands are as follows: A means advance the data tape reader one character and enter the number into the keyboard, B means advance the data tape reader one punched code but do not enter its code into the keyboard, C means synchronize the calibration tape loop and the raw data tape by first advancing the calibration until a C is found then advance the raw data tape until a carriage return (CR) is found, D is used in place of the C code at the beginning of the tape when a carriage return is not a part of the raw data tape and if desired between the data editing function and the constants, the C or D code must be received from the calibration tape before the system will accept the first code from the raw data tape. No tape synchronization is provided or required after a D code. L means operate the S (start) key to enter the number in the keyboard into the associated computer and initiate the calculation. 0 provides a one second time delay if and when required. The master control unit 15 reads the P and 0 codes as one and the same, since the five level of the calibration tape reader is not sensed.

Figure 2:
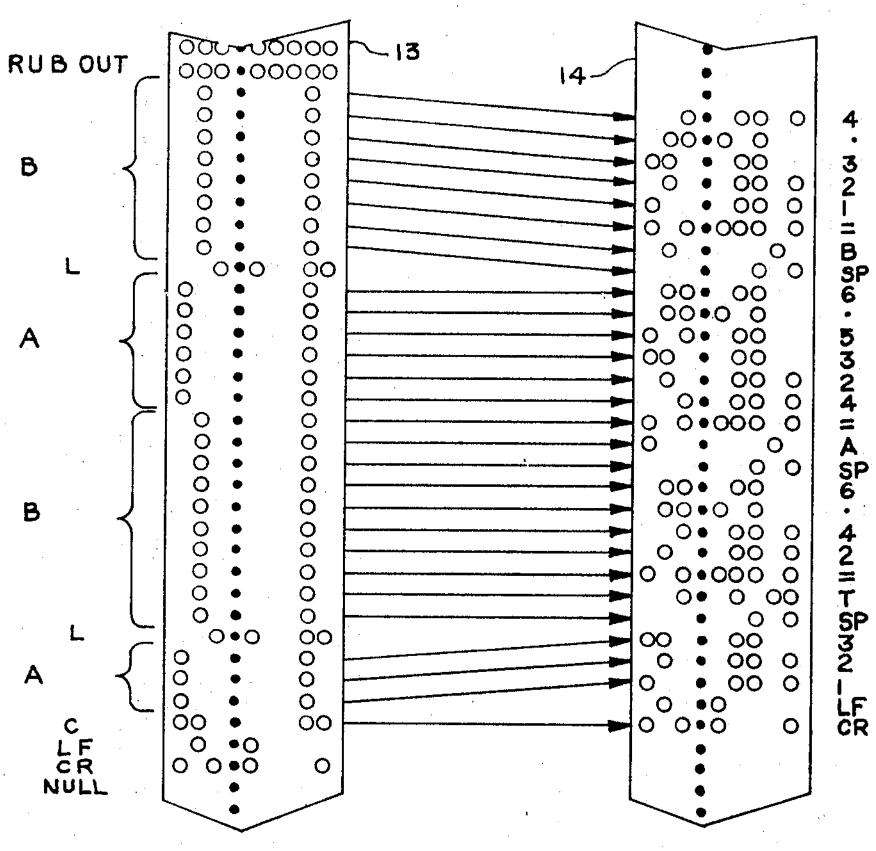
FIG. 2 illustrates typical calibration and data tapes such as may be used in the instant invention and the correlation between them.

A series of commands in the form of codes on a sample calibration tape required to enter specified numbers from a data block into a computer is illustrated in FIG. 2. The first command on a calibration tape is always a C code when the raw data tape contains a carriage return (CR). The CR is the synchronizing code on the raw data tape. The correspondence between the two is indicated by the arrow from the C code on the calibration tape to the CR code on the data tape. Other corresponding commands on the calibration tape and data on the data tape are also indicated similarly by arrows. When the analytical instrumentation does not produce a CR code on a data output tape, D is used in place of C as the first command. Synchronization must then be done manually. The A, B, and L codes are then punched in the correct sequence to select the specified data field from a data block. A D code may be inserted at this point to supply added utility during data reduction operation as will be described later. The codes for the constants in the tables required to complete the calculation are then punched.

The constants on a calibration tape are the calibration tables which establish the calibration curves that are used to interpolate the correct calibration factors required to determine the desired unit of measurement from raw analytical data. There are two additional codes used in the preparation of this portion of the tape but are not punched in the tape per se. They are F and S. F is any numerical codes (0 through 9) and the decimal point (6 level punched) entered into the keyboard from the calibration tape or manually and is designated a finger code. A space code is never used on a calibration tape. A, B, C, D, L and 0 (7 level punched), all the numerical codes and the decimal point (6 level punched) are "allowed codes" on the calibration tape loop, while all typing codes (6 or 7 level punched) on the raw data tape are read as "allowed codes." S, any nontyping code (6 or 7 level not punched) on either tape is designated as a special special code. All these "not allowed codes" except a CR on a raw data tape are ignored by the data tape editor. This simplifies the preparation of calibration tapes by allowing the use of CR's and line feed (LF) codes at any point on the tape.

Each table on the calibration tape represents a scale on a calibration curve chart. Corresponding scales must always have the same number of constants, that is, the first constant in each corresponding table is the first point on its calibration factor curve, the second constant being the second point, etc. The last command of each constant must be an L code and the last constant of each table must be 0 or a negative number. The last number is used to identify the table as well as its last entry. Remember that carriage return and line feed codes can be used at any point on this tape but space codes cannot be used at any point. Don't forget the D codes between the data field identification and the constants.

Once a programmed data block has been read into the data tape editor from a raw data tape and the specified data has been entered into the associated computer, the numerical constants of the tables are entered from the calibration tape into the computer in the order in which they are to be used. This function gives the associated computer a virtually unlimited memory capacity. A programmable tabletop computer which may be used with the preferred embodiment is an Olivetti Underwood 101 B Magnetic Card programmable desk top computer with print and space suppression on keyboard entry. The magnetic program card contains up to 120 instructions describing the computation to be made. This memory capacity is supplemented by the information stored on the calibration tape of the data tape editor.

Figure 3:
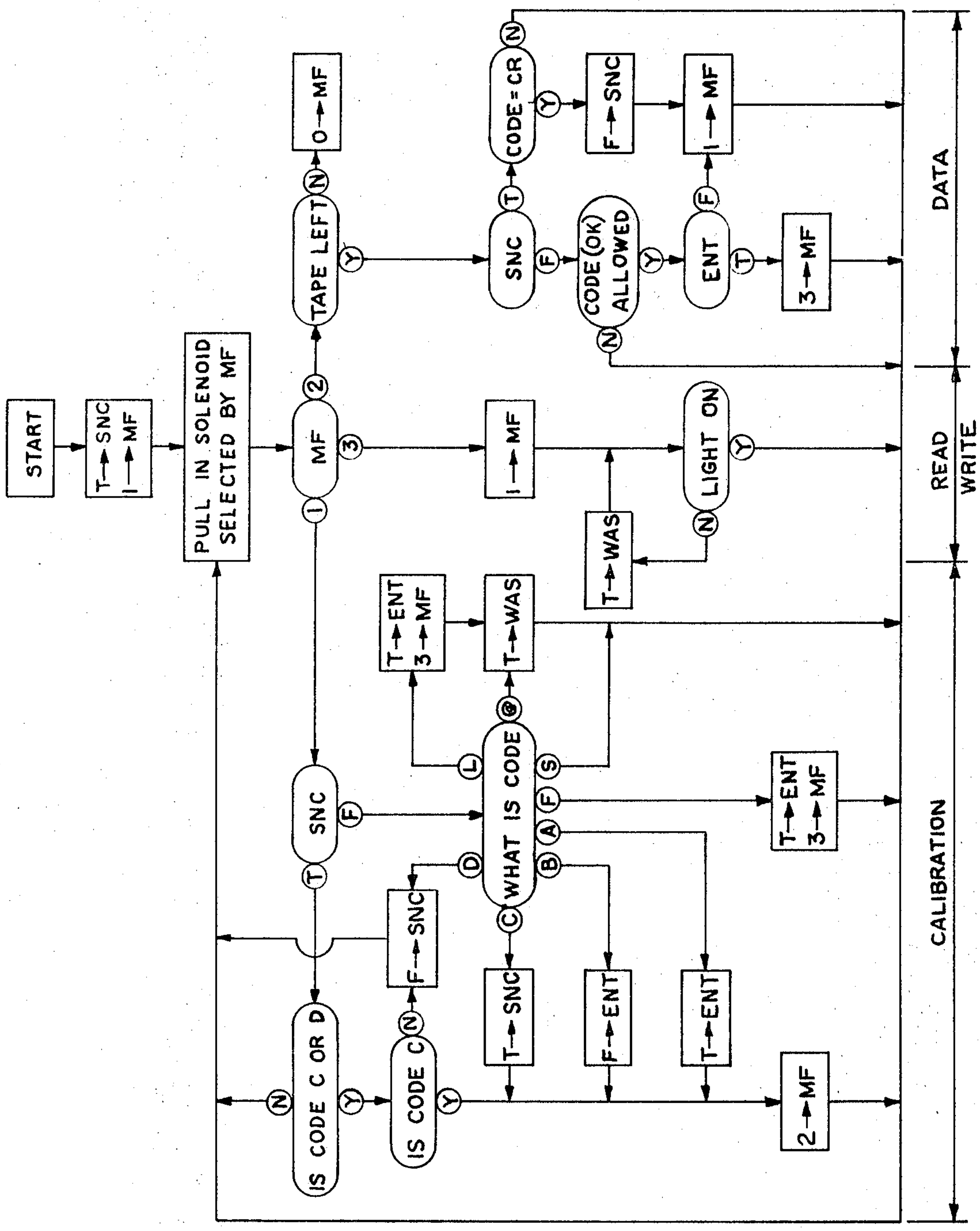
FIG. 3 illustrates a flow diagram of the algorithm of the data tape editor of the invention.

A more thorough understanding of how the data tape editor system performs can be gleaned from an examination of the flow diagram of its algorithm illustrated in FIG. 3. This flow can then be related to the logic diagram of FIG. 4.

A flow diagram of an algorithm is a pictorial description of a step-by-step procedure which is one or more recurrent processes that defines the solution of a problem. The flow diagram of FIG. 3 illustrates how the data tape editor edits raw data from an analytical instrument for insertion into an associated computer. The statements, or functions, included in rectangles initiate processes. The arrows mean "goes to" and denote the occurrence of an electronic function. The long ovals denote questions while the circles denote answers. The flow for the calibration tape reader 10 is on the left and the flow for the data tape reader 11 is on the right. The associated computer is busy when the flow comes down from 3. A letter in a circle designates a particular answer, an F–false, an N–no, a T–true and a Y–yes. Other abbreviations not defined elsewhere are, CRDR for Calibration reader, DRDR for data reader, ENT for enter, MF for moving finger, SNC for sync (CRDR and DRDR synchronization) and WAS for wait a second. When MF is 0, the editor is stopped or off; when 1, the calibration reader is actuated; when 2, the data reader is actuated; and when 3, the keyboard entry is actuated.

Upon entering the flow diagram of FIG. 3 with a start signal at the top, it an be seen that when the start tape pushbutton 17, illustrated in FIG. 1, is depressed to make it illuminate, a true "T" goes to SNC and 1 (one) goes to the moving finger (MF). The term MF refers to the decoded output of two bistable multivibrators which point to the calibration tape reader, the data tape reader or the keyboard entry unit. Thus the solenoid of the calibration reader 10, of FIG. 1, is pulled into to read the code and in turn dropped out to advance its tape. Since MF is at 1 and S is true, the question "is code C or D" is asked. If the code is neither C nor D the answer is no (N) and the solenoid for the calibration reader 10 is again pulled in. This loop will be repeated until a C or D is encountered on the calibration tape 13. The answer is then yes (Y).

When a C or D code is found the question "is code C" is asked. Assuming the answer is Y, 2 goes to MF and the solenoid of the data reader 11, of FIG. 1, is pulled in. If the answer to this question had been N, F would have gone to SNC. The solenoid for the calibration reader 10 would have been pulled in again and the question "What is Code" would have been asked. The obvious answer would be D which in turn would permit any allowed code to be put into the computer either manually or from the tape. This will be illustrated more fully later on.

Since MC is now at 2, the question "Is there any tape left in the data reader" is asked. Naturally the answer at this point is Y, but had it been N, O would go to MF, the unit would shut down, and the start tape pushbutton light would go out. When there is tape in the data reader and SNC is true, the question "Is the Code on the Data Tape a carriage return" is asked. Assuming the answer is N, the solenoid for the data reader 11 is again pulled in and this loop is repeated until a carriage return (CR) is encountered on the data tape 14. The answer is then Y.

With a yes answer at this point, F goes to SNC, 1 goes to MF, and the solenoid for the calibration reader 10 is pulled in. The two tapes 13 and 14 are now synchronized and the first control command is requested. The commands initiated by the codes A, B, C, D, L and 0 on the control tape 13, as well as the F and S codes, were previously described.

For purposes of discussion refer to the example of the calibration tape and data tape illustrated in FIG. 2 to show how a calibration tape enters specified numbers from data block into an associated computer. Since the code following the C in this example is A, T goes to ENT, then 2 goes to MF, and the solenoid for the data reader 11 is pulled in. With tape left and SNC false, the question "Is the code on the data tape 14 allowed" is asked. By looking at the tape it can be seen that the code is LF which it will be at this point in virtually all instances. LF, being a nontyping control function which is designated a "not allowed code" produces an N answer. This causes the data reader's solenoid to be pulled in again and a Y answer is then found, i.e., 1 is an allowed code.

Since the code is now allowed and ENT is true, 3 goes to MF and the number 1 solenoid on the keyboard entry unit 12 is activated momentarily to depress the associated computer's key. With MF at 3, 1 goes to MF and the question "Is the computer light on" is now asked of the photoelectric sense unit 20. If the answer is Y the calibration reader solenoid is pulled in to determine the next control code. When the answer is N, T goes to WAS to add a one second delay and the sense unit 20 checks the computer busy light again.

The next two codes are also A, so the process is repeated two more times to enter the 2 and 3 into the computer keyboard through the keyboard entry unit 12 before an L code is encountered. When an L code is encountered on a calibration tape, T goes to ENT to insure it is true, 3 goes to MF, T goes to WAS, and after one second delay the S solenoid on the keyboard entry unit 12 is depressed to enter the number in the keyboard entry unit into the associated computer and initiate the calculation.

Chances are that the computer busy light will be off when the question is asked this time and one second delays will be added. When the question is asked after the light comes on the calibration reader solenoid pulls in to determine the next control code.

The next control code received is a B command. F goes to ENT, 2 goes to MF, and the data reader solenoid is pulled in. With MF at 2, tape in the reader, SNC false, an allowed code (space), and ENT false, a 1 goes to MF and the calibration reader solenoid pulls in to determine the next control code. Since the next nine codes are B, the next nine allowed codes on the data tape 14 are rejected. At this point an A is encountered and the process previously described is repeated to enter the number 4235.6 first into the keyboard entry unit 12 and then into the associated computer. The remaining portion of the data block is rejected by the remaining B codes on the calibration tape 13.

Now that the specified data fields of the data block has been entered into the associated computer, the constants on a calibration tape must be entered into the computer. This is accomplished as follows. When the last entry on the data tape is put into the system, MF is at one and SNC is false so that any finger code from the calibration reader will be put into the associated computer's keyboard and any special codes will be ignored. Each constant has to be followed with an L in order to put it into a register in the associated computer.

As previously stated the use of the strategically placed D code on a calibration tape adds considerable utility to its use. This D code should be placed between the last command to the data block and the first number of the first constant in the first tables. This allows the manual or tape punch entry of any finger code into the computer, preceding the insertion of the tables.

To put numbers into a computer in place of the data field in the upcoming data block, place either reader switch in the "-stop" or "free" position during the insertion of the constants on the calibration tape. When the tables are all entered and the calculation is completed, the calibration reader searches to the next command on its loop tape. After many "null" or "rub out" codes, the C (or D) code at the beginning of the data field commands is encountered. Then, since one of the tape readers is turned off, when the "tape left" question is asked the answer is N and the start tape light 17 on the editor goes off. At this time the computer is operable just as though the control unit 15 didn't exist. The desired data can be manually entered into the computer, the tape reader switch returned to the start position and the start tape pushbutton depressed. Since SNC is now true and MF is at 1 again the calibration reader starts looking for C or D. This is where the D at the beginning of the constants comes into play. When it is encountered, F goes to SNC and the constants are entered into the computer. The programmed calculation is performed and the data reduction picks up where it was interrupted.

Once the flow diagram of a systems algorithm is essentially resolved, the next step is to transfer this information into the form of a logic diagram. The logic diagram of FIG. 4 employs the following standard symbols and conventions. Basically all functions operate in a true state. When a signal is made true or a barred signal is made false, that's where the action occurs.

Logic symbols are oriented on drawings so that all signals flow through them either horizontally or vertically, not on a diagonal. Symbols with more than a single input or output, for example multivibrators, are subject to orientation conventions to distinguish among the possible connections. Unless otherwise specified, the voltage level nearest to ground is understood to be the true or 1 level and the voltage farthest from ground is understood to be the false or 0 level. A symbol is named by writing a suitable designation inside the symbol. It is then understood that the output signal, the true or 1 output if there is more than one, bears the same name and the false or 0 output, if there is one, bears the name with the negation indicated, that is, with a bar over the name. An input signal from another diagram is shown by enclosing the signal name in a circle. All incoming and outgoing signals are named. An output signal to some other diagram is shown by enclosing the name of the signal in a rectangle. Arrows not in contact with symbols are used to indicate direction of signal flow. A DC connection is illustrated by a straight line coming into an element, an AC input connection by an arrow coming into an element, a DC inhibit input connection by a line terminating in a circle coming into an element and an AC inhibit input connection by a line terminating in a circle with an arrow on it coming into an element. Interconnected cross wires are indicated by a dot. A semicircle with input leads drawn to but not thru the chord designates an AND gate. If the leads extend into the semicircle to the arc of the circle this is an OR gate. A triangle with input leads not extending into the triangle is a NAND gate which with a single input acts as an inverter. With the leads extending through the triangle it is a NOR gate. Two adjacent rectangles, without diagonals, illustrate a bistable multivibrator. If one of the rectangles has a diagonal line this is a monostable multivibrator normally in a state with a true signal in the rectangle with the diagonal. If both the rectangles have a diagonal line, this is an astable multivibrator. When the rectangles are drawn up and down the lower output is called the true or 1 output and the upper output is called the false or 0 output. If the rectangles are drawn side to side the rightmost output is true and the leftmost is false. In the vertical arrangement the lower input is called SET and the upper is called RESET. When the SET input receives a true pulse the true output is set to 1. An input directed to the centerline of the symbol is called a triggering input and when pulsed true causes the multivibrator to change state. All other operations are shown in a rectangle, the operation abbreviation is indicated inside the symbol and if not the name. The symbol set is not designed to represent analog operations such as amplification, although such operations may be included in the diagram by means of the all other operation convention.

Turning now to the logic diagram, momentarily depressing the power pushbutton 16, of FIG. 1, supplies line voltage to the power supply (not illustrated) which in turn produces the required operating voltages for the instrument and illuminates the power pushbutton. Depressing this pushbutton when it is illuminated removes power. When the power pushbutton is illuminated, minus 10 volts is applied to the terminal 21 of FIG. 4A. Then when in turn the start tape pushbutton 17 is depressed the GOPB (go pushbutton) signal is generated and goes to a one shot or monostable multivibrator 23 to initiate or stop the systems operation. This is the start signal on the flow diagram of the instruments algorithm in FIG. 3.

Looking at the flow diagram of FIG. 3 it can be seen that the net required operation in the process is to make SNC true and set MF to 1. Now returning to FIG. 4A of the logic diagram, it can be seen that the output from the one shot 23 does exactly that. The signal goes through the SNC bistable multivibrator 24 self gating to make sure it is true. The true signal from the lower side of the one shot 23 is applied to one side of the AND gate 25 and if SNC is false, then the signal from the top side of 24 goes around to the other input of AND gate 25 which then provides an output to set SNC 24 true. Since the MF bistable multivibrators 26 and 27 are always at 00 when the operation is initiated, the output from the lower half of one shot 23 also goes through their self gating to set MF to 1 (01). This is done by sending the signal from 23 through the AND gate 28, which is false enabled by the signal on the lower side of multivibrator 27, to provide a true output, which then goes through AND gate 29, which is enabled by the signal in the top of multivibrator 26, to set multivibrator 26 true. The signal from multivibrator 23 cannot reach the bottom of multivibrator 27, therefore the MF multivibrators 26 and 27 are set in the 01 state.

Stopping the system operation is accomplished by setting the MF multivibrators 26 and 27 to 00 with a GOPB signal to multivibrator 23 whose output is gated with RUN signal from OR gate 32 (start tape light on) to the top side of multivibrators 26 and 27 through AND gates 30 and 31 respectively. The RUN signal is true since at least one of multivibrators 26 or 27 is set and these are the inputs to the OR gate 32, the output of which is the RUN signal. Multivibrator 27 may be separately gated with a clock pulse that is self gated through AND gate 33, which is false enabled by the top of multivibrator 27, to an AND gate 34. Gate 34 is enabled by TPL (tape left) being false when $\overline{\text{DMF2}}$ (Decoded Moving Finger Step 2 not) goes false since then the output of OR gate 35 is false, and since one of the inputs to NAND gate 36 is false its output is true. This enables AND gate 34 and resets the top side of multivibrator 27. This method of stopping the system operation applies when MF is 2, since the clock pulse under these circumstances will not reset multivibrator 26. The TPL signal comes from the calibration and data tape readers of FIG. 4B and is made false when either tape reader switch is not in the start position or either reader has no tape. The $\overline{\text{TPL}}$ signal is generated to FIG. 4C by inverting the TPL signal in inverter 37. The RUN signal, which is true when the MF multivibrators are at 01, 10 or 11; that is, MF 1, 2 or 3, produces GOLI (the go light signal) to illuminate the start tape pushbutton 17 by doubly inverting it in NAND gates 38 and 39 in FIG. 4D.

Figure 4A:
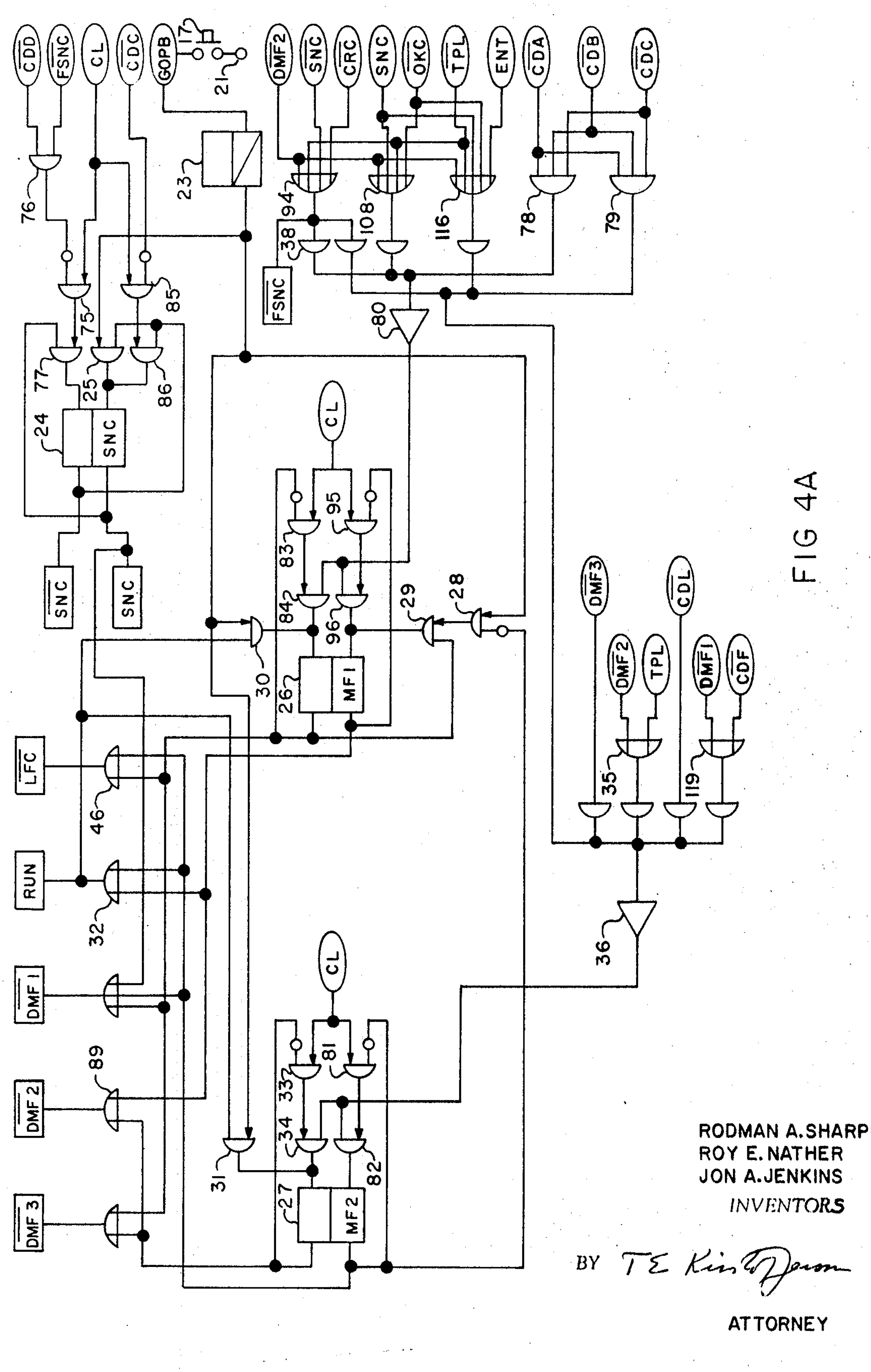
FIGS. 4A through 4M (for which the terminology is defined later) each represent a portion of a logic diagram of a preferred embodiment of the invention in greater detail, as follows.
Figures 4B, 4C, 4D, 4E, 4F, 4H:
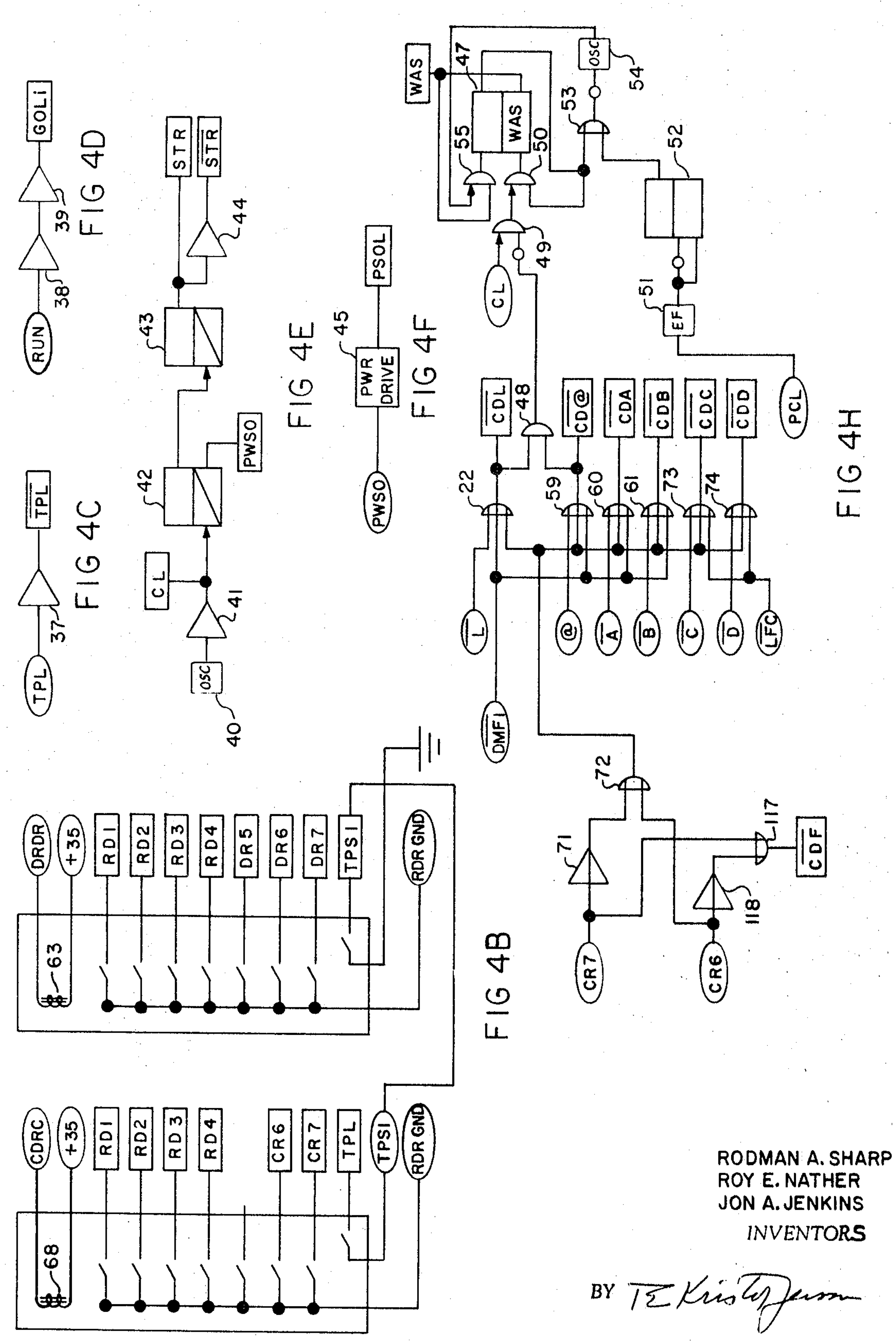

The CL (clock pulses), PWSO (power shut off), STR (Strobe) and $\overline{\text{STR}}$ signals are generated in FIG. 4E where a unijunction oscillator OSC 40 pulses through inverter 41 at the output of which the clock pulses are present which trigger the monostable multivibrator 42 out of the bottom side of which the PWSO signal comes and the top side of which is used in turn to trigger the monostable multivibrator 43. The signal from the top side of multivibrator 43 is STR, and when inverted by NAND gate 44, $\overline{STR}$. PWSO is amplified in FIG. 4F by amplifier 45 to generate PSOL (power shut off line) signal.

Each succeeding block on the flow diagram of FIG. 3 has a corresponding circuit on the logic diagram of FIG. 4. The circuit that pulls in the solenoid so that calibration tape reader is selected by the moving finger when it is at 1, has to generate a CRDR signal in FIG. 4G. This is accomplished with a $\overline{STR}$ false pulse when $\overline{LFC}$ (look for code not), WAS and BDO (better drop out) are all false. The $\overline{STR}$ pulse occurs every 50 milliseconds or 20 times a second at the output of inverter 44 FIG. 4E. $\overline{LFC}$ goes false when MF goes to 1 so the top of multivibrator 26 and the bottom of multivibrator 27 are both false into OR gate 46. WAS from multivibrator 47 in FIG. 4 and BDO from multivibrator 48 in FIG. 4I are false when GOPB is depressed since they are clamped when the system is off. When $\overline{LFC}$, WAS and BDO are false, the output of OR gate 66 in FIG. 4G is false, false enabling AND gate 67 which then passes a signal, when $\overline{STR}$ is false at its other input, to fire its associated silicon controlled rectifier 65, yielding a CRDR output. WAS remains false until a $\overline{CDL}$ (code L not) or a $\overline{CD@}$ (code @ not) false signal is generated at the outputs of OR gates 22 and 59 respectively of FIG. 4H, when $\overline{L}$ is false out of gate 120 and @ is false out of gate 121 of FIG. 4G, as described later, $\overline{DMF1}$ is false because MF is 1, and CR6 and CR7 (calibration reader pins 6 and 7) are such that the output of gate 72 is false, as described later. The result is that AND gate 48 in FIG. 4H has a false output enabling AND gate 49 which can then accept the next clock pulse and pass it through AND gate 50 which is enabled by the top of WAS multivibrator 47 changing the state of WAS to true. In many instances a 1 second delay is not sufficient. PCL (Photoelectric Cell Sensor) in conjunction with emitter follower EF 51 and multivibrator 52 will discharge the timing capacitor in unijunction oscillator OSC 54 through OR gate 53, and thereby extend the 1 second delay to whatever period required. The output of the emitter follower EF 51 is false when the computer busy light is out. The PCL must be on steady for 1 second before WAS is made false again by changing the state of multivibrator 52 giving a false output to OR gate 53 which receives a false input from the top of WAS–47 and false enabling unijunction oscillator OSC 54 which then sends a signal through AND gate 55, the other side of which is enabled by the signal from WAS–47 to reset WAS. THE BDO signal is required to keep either reader from pulling in more than 10 times a second. The readers operate on alternate CL pulses together or every other pulse alone. The $\overline{LFC}$ false signal removes the inhibit from AND gate 56 of FIG. 4I to allow the clock pulse to alternate the condition of BDO–48 until C code is found or SNC goes false at which time $\overline{DMF2}$ allows it to alternate. When $\overline{LFC}$ is false gate 56 is false enabled and the clock pulse passes through it to AND gate 57 which is enabled by BDO being set and $\overline{CDA}$, $\overline{CDB}$ and $\overline{CDC}$ (Code A, B and C not) all being true. Thus gate 57 passes the pulse to set BDO true. When BDO is true the gate 58 is enabled by BDO to pass the next clock pulse resetting it false. When a C code is found $\overline{CDC}$ becomes false removing one of the inputs from AND gate 57 and stopping the alternating of BDO. $\overline{CDC}$ becomes false when gate 69 in FIG. 4G has a false output when a C code is detected, as described hereinafter, then its false output $\overline{C}$, together with $\overline{LFC}$ false and the output of gate 72 false, as described hereinafter, make the output of gate 73, or $\overline{CDC}$, false. $\overline{CDA}$ and $\overline{CDB}$ are true as long as the A or B codes are not detected and the outputs of gates 97 and 113 in FIG. 4G, $\overline{A}$ and $\overline{B}$, are true. If either of these is true then a true input is provided to OR gates 60 or 61 respectively and their outputs, $\overline{CDA}$ ad $\overline{CDB}$ are true.

Figure 4G:
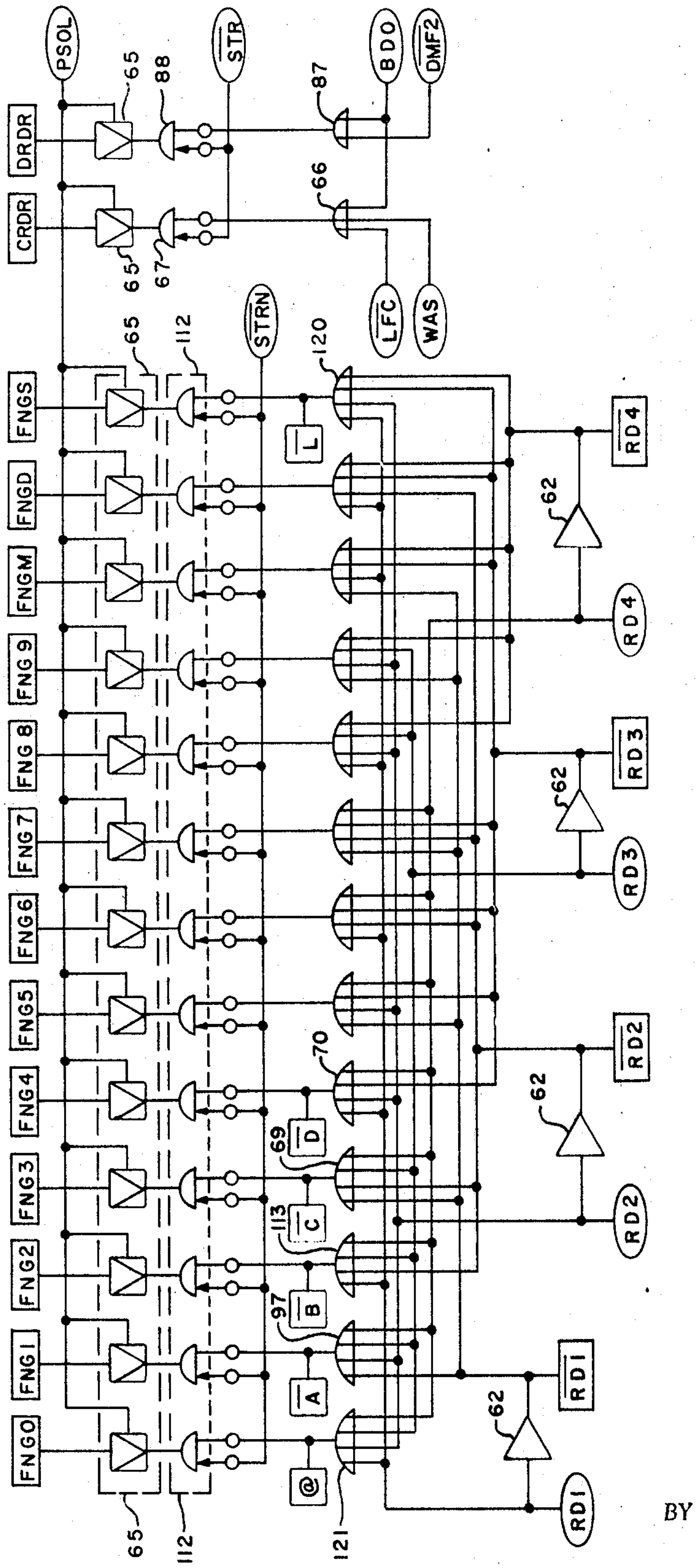
Figures 4I, 4J, 4K:
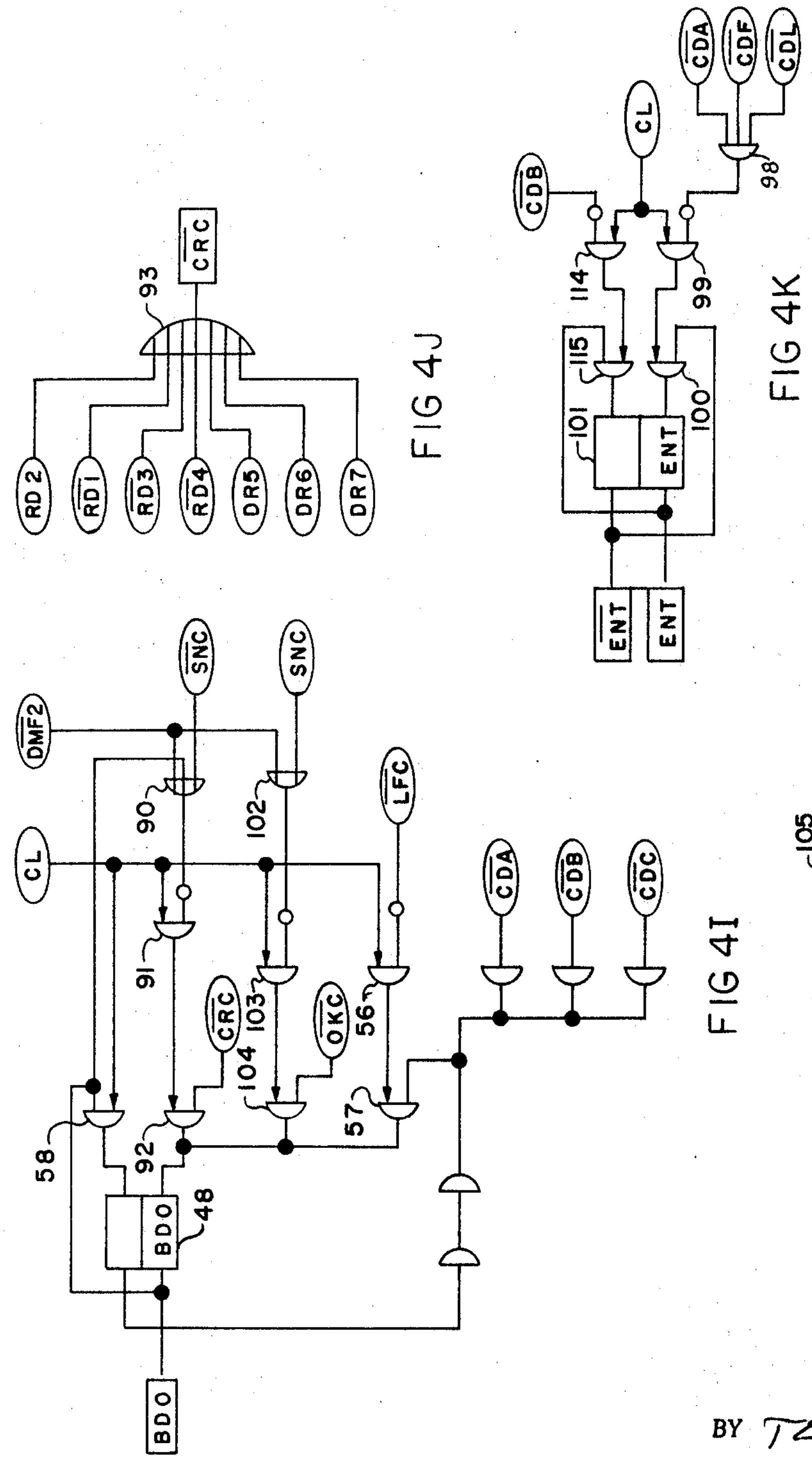

If SNC goes false, $\overline{SNC}$ goes true and OR gate 90, of FIG. 4I, is inhibited and can't pass a clock pulse. Since MF is 1, $\overline{DMF2}$ is true and OR gate 103 is inhibited by the true output of gate 102 and can't pass a clock pulse. Since at least one of $\overline{CDA}$, $\overline{CDB}$ and $\overline{CDC}$ is false gate 57 is inhibited and won's pass a clock pulse so BDO–48 stops alternating. The calibration reader solenoid 68, of FIG. 4B, drops out when the PSOL signal pulls the silicon controlled rectifiers 65, of FIG. 4G, below ground to shut them off.

While the calibration reader solenoid 68 of FIG. 4B is pulled in by the CRDR signal the code which is generated by the contacts that are allowed to close where there are no holes in the tape is read into the master control module of FIG. 4G as indicated along the bottom of the figure. RD1–4 (Reader pins 1 to 4) are each inverted by inverters 62 associated with them to yield $\overline{RD1–4}$. When a $\overline{C}$ or $\overline{D}$ false signal is decoded in FIG. 4G the respective $\overline{CDC}$ or $\overline{CDD}$ (code D not) false signal is generated in FIG. 4H as described above. For example, $\overline{RD1}$, $\overline{RD2}$, RD3 and RD4 false signals decode a $\overline{C}$ false signal through OR gate 69. RD1, RD2, $\overline{RD3}$ and RD4 false signals decode a $\overline{D}$ false signal through OR gate 70. The true CR7 signal is inverted by inverter 71 in FIG. 4H to combine with the false CR6 signal to give a false output from AND gate 72, and since $\overline{LFC}$ is false into OR gates 73 and 74 either a $\overline{CDC}$ or a $\overline{CDD}$ false signal is generated at the outputs of one of these gates.

When the code is D the $\overline{CDD}$ false signal removes the inhibit from the AND gate 75 of FIG. 4A by making the output of AND gate 76 false so that a clock pulse will then pass through gate 75 and into AND gate 77, which is enabled by the SNC–24 being true, such that gate 77 then passes a pulse to the top of SNC–24 setting it false. The next calibration control code is then sought. No tape synchronization is provided. The D code is used when tape synchronization is not required (no CR code on the raw data tape) or is not desired.

When the code is C, the $\overline{CDC}$ false signal to the AND gates 78 and 79 makes their outputs false, which in turn make he outputs from NAND gates 80 and 36, respectively, true. This allows a clock pulse to set MF to 2 by changing the condition of multivibrator 27 through AND gate 81 which was false enabled by 27, since MF was 1, and AND gate 82 which is enabled by the true signal from NAND gate 36. Multivibrator 26 which was true since MF was 1, is changed to false, since AND gate 83 is false enabled by the top of multivibrator 26, and AND gate 84 is true enabled by the output of NAND gate 80, such that the clock pulse goes through gates 83 and 84 setting multivibrator 26 false. Also the $\overline{CDC}$ false signal removes the inhibit from AND gate 85 allowing a clock pulse to pass through, and through AND gate 86 if SNC–24 is false, enabling AND gate 86, in order to set SNC–24 true.

Now with MF at 2, TPL true, and SNC true, a carriage return code is sought on the raw data tape. The circuit that pulls in the data reader solenoid 63 of FIG. 4B, selected by the moving finger when it is at 2, has to generate a DRDR signal. That is, $\overline{DMF2}$ and BDO into OR gate 87 in FIG. 4G must be false, enabling AND gate 88 to allow the $\overline{STR}$ false pulse through gate 88 to actuate its associated silicon controlled rectifier 65, yielding the DRDR output signal. $\overline{DMF2}$ goes false when MF goes to 2 and the inputs to OR gate 89 in FIG. 4A from the bottom of multivibrator 26 and the top of multivibrator 27 are both false. BDO is allowed to alternate by the BDO, $\overline{SNC}$, and $\overline{DMF2}$ false signals into the OR GATE 90 false enabling AND gate 91, until the $\overline{CRC}$ (carriage return code not) signal into AND gate 92 is made false, inhibiting gate 92. When BDO goes true, a clock pulse hits its top through AND gate 58 which is enabled by BDO true, and when BDO is false a clock pulse goes through gates 91 and 92 to set it true.

When a carriage return code is found a $\overline{CRC}$ false signal is generated in FIG. 4J, all the inputs to OR gate 93 being false. This $\overline{CRC}$ false signal combines with the $\overline{SNC}$, $\overline{DMF2}$ and $\overline{TPL}$ false signals through OR gate 94 in FIG. 4A to make its output, $\overline{FSNC}$ (false to SNC) false, which in turn removes the inhibit from AND gate 75 by creating a false output from AND gate 76, to allow a clock pulse through AND gate 75 to set SNC–24 false through AND gate 77 which was enabled by SNC–24 true. The $\overline{FSNC}$ false signal also appears true at the output of NAND gates 36 and 80 to allow the setting of the MF multivibrators 27 and 26 to 01 so that the next calibration code is sought. This is done since AND gate 95 is false enabled by 26 to pass the clock pulse though to AND gate 96 which is true enabled by NAND gate 80. The output of AND gate 96 sets MF to 1. The true output of NAND gate 36 enables AND gate 34, and since MF was at 2 the false signal from the top of multivibrator 27 false enables AND gate 33, the clock pulse passing through it and through gate 34 to set multivibrator 27 false.

An A code on the calibration tape generates a $\overline{A}$ false code out of OR gate 97 of FIG. 4G since the inputs $\overline{RD1}$, RD2, RD3, and RD4 are false. This gives a $\overline{CDA}$ false code out of gate 60 of FIG. 4H as previously described which goes into AND gate 98 of FIG. 4K to make its output false, enabling AND gate 99, to permit a clock pulse to pass through gate 99, and through AND gate 100, which is enabled by ENT false from the top side of ENT multivibrator 101, to set ENT true.

Since MF is at 1, $\overline{CDA}$ false will also serve to set MF to 2 since the output of gate 78 in FIG. 4A will then be false such that the output of NAND gate 80 will be true, enabling gate 96 to pass a pulse from the clock through gate 95 which is false enabled by multivibrator 26, to set it to 0. At the same time multivibrator 27 is made false by $\overline{CDA}$ false giving a false output to gate 79 and a true output to gate 36 which then enables gate 34 to pass a clock pulse from gate 33 which is false enabled by multivibrator 27 to reset 27 false.

The next raw data code is then sought. BDO is allowed to alternate by the SNC and $\overline{DMF2}$ false signals, which yield a false output to OR gate 102 in FIG. 4I, false enabling AND gate 103 to pass a clock pulse through AND gate 104, which is enabled by $\overline{OKC}$ (OK Code not or not an "allowed code"), and set BDO–48 true. When BDO is true AND gate 58 is enabled to pass the next clock pulse to alternate it and set it false. This takes place until $\overline{OKC}$ is made false by a DR6 or DR7 (Data Reader pins 6 or 7) signal in FIG. 4L. A DR6 signal will yield a true output from OR gate 105 and since the inputs to NAND gate 106 are true and false its output will be true, making the inputs to NAND gate 107 both true such that its output will then be false. If both DR6 and DR7 were true the output of gate 105 is true, the output of gate 106 is false and the output of gate 107 would be true. The $\overline{OKC}$ false signal, along with SNC, $\overline{TPL}$ and $\overline{DMF2}$ false signals allows a clock pulse to set MF to 3. Since all the inputs to OR gate 108 in FIG. 4A are then false, its output is false making the output of gate 80 true, enabling gate 84 to pass the next clock pulse received from gate 83, which is false enabled by multivibrator 26, with the output of gate 84 then setting 26 to its 1 state and MF to 3.

Figure 4L:
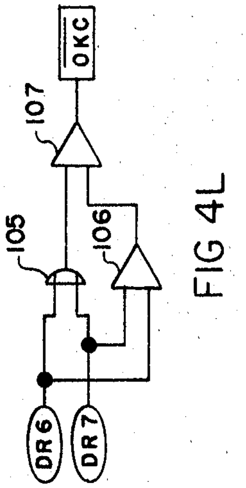
Figure 4M:
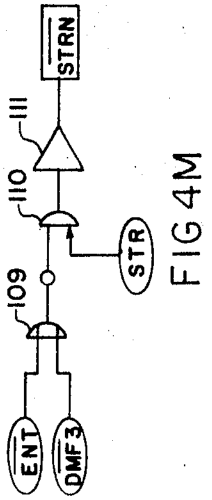

Turning to FIG. 4M the $\overline{ENT}$ false signal together with $\overline{DMF3}$ false yield a false output from OR gate 109, false enabling AND gate 110 to allow the STR true signal through to be inverted by NAND gate 111 generating a $\overline{STRN}$ (Strobe now not) false signal. This false enables AND gates 112 in FIG. 4G, and the selected code is put into the associated computer keyboard by the keyboard entry unit since gates 112 will each fire its associated silicon controlled rectifier 65 providing outputs at the appropriate points. The $\overline{DMF3}$ false signal allow the next clock pulse to set MF which was at 3 to 1 by providing a false signal inverted by NAND gate 36 to true enable gate 82, which will then pass the clock pulse from gate 81, which is false enabled by multivibrator 27 to set it to 0. This in turn allows the next calibration code to be sought, when the computer light has been on steady for at least one second giving oscillator 54 time to reset $\overline{WAS}$ in FIG. 4H.

The B code on the calibration tape generates a $\overline{B}$ false code out of OR gate 113 in FIG. 4G, since RD1, RD2, RD3 and RD4 are all false. This in turn generates a $\overline{CDB}$ false code out of gate 61 in FIG. 4H, as previously described, which false enables AND gate 114 in FIG. 4K allowing the next clock pulse through to AND gate 115 which is enabled by ENT–101 true, to set ENT false. $\overline{CDB}$ false also yields false outputs from AND gates 78 and 79 in FIG. 4A which appear as true outputs from gates 36 and 80, which in turn enable gate 34 to pass the next clock pulse from gate 33 which is false enabled by multivibrator 27, in order to set 27 false. Gate 80 true enables gate 96 to pass the next clock pulse from false enabled gate 95 to set multivibrator 26 true, setting MF to 2. The next raw data code is sought and BDO alternates if $\overline{OKC}$ is not false in the manner described above. The ENT false signal along with $\overline{OKC}$, SNC, TPL and $\overline{DMF2}$ false signals provide all false inputs to OR gates 108 and 116 of FIG. 4A whose false outputs make the outputs of gates 36 and 80 both true, allowing the next clock pulse to set MF from 2 to 1 by alternating both of multivibrators 26 and 27 in the manner previously described.

Any finger code on the calibration tape (CR6 true and CR7 false) generates a $\overline{CDF}$ (Code F not) false code in FIG. 4H since the two inputs to OR gate 117 are both false, CR7 being false and CR6 true being inverted by NAND gate 118. Turning to FIG. 4K, $\overline{CDF}$ false make the output of AND gate 98 false, false enabling gate 99 allowing a clock pulse to pass through gate 100 which is enabled by the top of ENT–101 to set the bottom of ENT–101 true. $\overline{CDF}$ false together with $\overline{DMF1}$ false go through OR gate 119 in FIG. 4A to provide a false output and a true output from gate 36 to set MF to 3 with the next clock pulse in the manner previously described, since MF was 1. The finger code is put into the computer keyboard by $\overline{ENT}$ false, $\overline{DMF3}$ false and STR making $\overline{STRN}$ false in FIG. 4M in the manner previously described, and enabling the gates 112 of FIG. 4G. The next calibration code is sought with the same sequence as the A code described above.

Any special code S on the calibration tape (CR6 and CR7 false) prevents the generation of any calibration code because, looking at FIG. 4L, with both inputs to gates 105 and 106 false the output of 105 is false and the output of 106 is false making both inputs to 107 false and its output false. Accordingly $\overline{OKC}$ false prevents BDO in FIG. 4I from alternating, and since $\overline{CDF}$ is true, the output of gate 119 in FIG. 4A is true and the output of gate 36 is false so that MF is not alternated. Accordingly, the reader moves past the special codes as though they don't exist.

An L code on the calibration tape generates a $\overline{L}$ false code out of OR gate 120 of FIG. 4G since RD1, RD2, $\overline{RD3}$ and $\overline{RD4}$ are all false. $\overline{CDL}$ false, out of gate 22 in FIG. 4H, then provides a false output from gate 98 of FIG. 4K, false enabling gate 99 allowing the next clock pulse to go through it and through gate 100 which is false enabled by ENT–101 to set ENT true. A $\overline{CDL}$ false also provides a false input to gate 36 in FIG. 4A, and a true output permitting MF to be set to 3 from 1 in the manner previously described. This permits the generation of the $\overline{STRN}$ false signal in FIG. 4M as previously described, which in turn false enables the gate 112 associated with OR gate 120 permitting the associated silicon controlled rectifier 65 to fire, depressing the corresponding solenoid into the associated computer. After a 1 second delay and a steady green light the next calibration code is sought in the same sequence as that described when an A code is encountered.

The generation of either a $\overline{L}$ or a $\overline{CD@}$ false signal out of OR gates 120 or 121 of FIG. 4G and $\overline{CDL}$ or a $\overline{CD@}$ out of gates 22 and 59 respectively in FIG. 4H, allows a clock pulse to make WAS true, since these false signals make the output of gate 48 false, false enabling gate 49 which then can pass a clock pulse through gate 50, which is enabled by $\overline{WAS}$, to set WAS–47 true. This makes the inputs to gate 53 false, false enabling oscillator OSC 54, which in turn will make WAS–47 false after 1 second. A flickering computer light causes a photoelectric cell sensor to generate PCL signals to repeatedly restart the oscillator OSC 54 by causing the output of emitter follower EF 51 to be false, creating a true output from the top of multivibrator 52 discharging the timing capacitor in oscillator OSC 54 as previously described.

Since the principles of the invention have now been made clear, modifications which are particularly adapted for specific situations without departing from those principles will be apparent to those skilled in the art. The appended claims are intended to cover such modifications as well as the subject matter described and to only be limited by the true spirit of the invention.

We claim:

1. In a data processing and computing system of the type wherein data may be entered by actuating keys of a keyboard input instrument, a data tape editor comprising:

a plurality of tape readers, at least one of said plurality being adapted to read coded information from a calibration tape and at least another of said plurality being adapted to read coded information from a raw data tape, said readers generating coded digital signals in response to the coded information;

a master control unit connected to said plurality of tape readers for receiving said coded digital signals and controlling said readers, said master control unit having logic circuitry responsive to said coded digital signals to synchronize the readers, determine validity of said coded digital signals, start and stop said readers, and to generate edited output signals; and, a keyboard entry unit connected to said master control unit for receiving said edited output signals, said entry unit being placed over the keys of the keyboard input instrument and having means for depressing the keys of the keyboard input instrument in response to said edited output signals, thereby entering the edited coded information into the data processing and computing system.

2. The editor of claim 1 in which said keyboard entry unit is a solenoid deck.

3. The editor of claim 1 in which the keyboard input instrument is a programmable desk calculator having keys which are actuated by said keyboard entry unit attached over the keys of said calculator.

4. The editor of claim 1 in which the calibration tape reader reads constants from a calibration tape and said master control unit contains means for entering said constants through said keyboard entry unit into the data processing and computing system.

5. The editor of claim 1 further including a sense unit which is connected as an input to said master control unit to sense when the data processing and computing system is busy and in response thereto to create a signal to cause a delay in the operation of said master control unit.

6. The editor of claim 5 in which said data processing and computing system is a programmable desk calculator having keys and a busy light, said keys being activated by said keyboard entry unit attached over the keys of said calculator and said sense unit being responsive to said calculator busy light.

7. The editor of claim 1 in which said calibration data tape also contains constants thereon and said control unit tape readers for reading data to be edited and a third reader for reading calibration data.

8. The data tape editor defined in claim 7 in which said logic circuitry of said master control unit includes means for determining whether said first or second raw data tape reader is to be sensed next, so that the information read by said first and second raw data tape readers may be combined in a selected sequence for entry into the data processing and computer system through said keyboard entry unit to perform an operation involving a combination of data from both said first and second raw data tape.